US011409858B2

(12) United States Patent
Luciani, Jr. et al.

(10) Patent No.: US 11,409,858 B2
(45) Date of Patent: Aug. 9, 2022

(54) AUTHORIZED DEVICE OR COMPONENT DETERMINATIONS

(71) Applicant: HEWLETT PACKARD ENTERPRISE DEVELOPMENT LP, Houston, TX (US)

(72) Inventors: Luis E. Luciani, Jr., Tomball, TX (US); Sze Hau Loh, Cypress, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 345 days.

(21) Appl. No.: 16/409,929

(22) Filed: May 13, 2019

(65) Prior Publication Data
US 2020/0364326 A1  Nov. 19, 2020

(51) Int. Cl.
| G06F 21/44 | (2013.01) |
| H04L 9/32 | (2006.01) |
| G06F 3/14 | (2006.01) |
| G06F 1/26 | (2006.01) |

(52) U.S. Cl.
CPC ............. *G06F 21/44* (2013.01); *G06F 1/266* (2013.01); *H04L 9/3271* (2013.01); *G06F 3/14* (2013.01); *G06F 2221/2129* (2013.01)

(58) Field of Classification Search
CPC . G06F 21/44; G06F 1/266; G06F 3/14; G06F 2221/2129; H04L 9/3271; H04L 9/0894; H04L 9/3247; H04L 2209/12
See application file for complete search history.

(56) References Cited

U.S. PATENT DOCUMENTS

| 6,446,230 | B1 | 9/2002 | Chung | |
| 8,296,613 | B2 | 10/2012 | La Fever et al. | |
| 9,767,318 | B1* | 9/2017 | Dropps | ................... G06F 21/72 |
| 9,876,645 | B1* | 1/2018 | Ramalingam | ........... G06F 21/44 |
| 2009/0307546 | A1* | 12/2009 | Dunn | ................ G01R 31/31719 |
| | | | | 713/182 |
| 2013/0067236 | A1* | 3/2013 | Russo | ..................... G06F 21/73 |
| | | | | 713/189 |
| 2013/0290735 | A1* | 10/2013 | Rombouts | ............... G06F 21/33 |
| | | | | 713/189 |

(Continued)

FOREIGN PATENT DOCUMENTS

| CN | 101694514 B | 7/2012 |
| JP | H10161901 A | 6/1998 |

OTHER PUBLICATIONS

Colin M. Maunder and Rodham E. Tulloss, "The Test Access Port and Boundaryscan Architecture," 2005, pp. 1-394, IEEE Computer Society Press.

(Continued)

*Primary Examiner* — Robert B Leung
(74) *Attorney, Agent, or Firm* — Trop, Pruner & Hu, P.C.

(57) ABSTRACT

In some examples, a scanner that is to verify a device includes a scanner input/output (I/O) interface to physically and communicatively connect to a device I/O interface of the device. The scanner includes a processor to send an input through the scanner I/O interface to the device, receive, at the scanner I/O interface, an output responsive to the input from the device, the output comprising a cryptographic value based on a cryptographic operation applied on data of the input, and determine whether the device is an authorized device based on the received output.

20 Claims, 5 Drawing Sheets

(56) References Cited

U.S. PATENT DOCUMENTS

2014/0149815 A1* 5/2014 Sun ..................... G11C 29/02
714/727
2015/0026370 A1* 1/2015 Marsh ..................... G06F 1/26
710/63
2015/0331463 A1* 11/2015 Obie ..................... G06F 1/1632
713/300

OTHER PUBLICATIONS

Luciani et al., A Method for Using a Portable JTAG Boundary Scanner to Authenticate Integrated Circuits In Situ, Mar. 18, 2019 (3 pages).
Wikipedia, JTAG last edited Mar. 8, 2019 (10 pages).
IEEE, "IEEE Standard for Test Access Port and Boundary-Scan Architecture," available online at <https://standards.ieee.org/standard/1149_1-2013.html > [Accessed Nov. 30, 2018], Feb. 6, 2013, 6 pages.

* cited by examiner

AUTHORIZED DEVICE OR COMPONENT DETERMINATIONS

BACKGROUND

An electronic device can include various electronic components, such as a processor, a core controller, a network interface controller, a storage device, and so forth. In some cases, the electronic components can be mounted on a circuit board (or multiple circuit boards) of the electronic device.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Electronic components to be included in an electronic device can be provided from specific supplier(s). A "supplier" of an electronic component can refer to a manufacturer of the electronic component, a distributor of the electronic component, a seller of the electronic component, or any other provider of the electronic component.

Specific electronic components to be included in a specific model of an electronic device, along with the suppliers of the electronic components, can be specified by an enterprise that is the seller or distributor of the model of the electronic device. Such electronic components from the specified supplier(s) are referred to as "target electronic components." The enterprise may have picked the target electronic components because the target electronic components are from trusted supplier(s).

In some cases, electronic devices are manufactured or assembled by an entity that is different from the enterprise. The enterprise may not know whether or not target electronic components have been included in the electronic devices, as the electronic devices may be shipped by the manufacturer or assembler directly to customers of the enterprise.

There are several opportunities for target electronic components to be replaced with unauthorized electronic components in electronic devices in a supply chain. For example, workers at the manufacturer or assembler may mount an unauthorized electronic component in place of a target electronic component in an electronic device. As another example, during shipment of an electronic device, unauthorized personnel may remove a circuit board from the electronic device, and physically replace a target electronic component with an unauthorized electronic component. Examples of electronic components include any or a combination of the following: a processor, a network interface controller, a storage device, a management controller, or any other type of electronic component.

Examples of unauthorized electronic components include a counterfeit electronic component, an electronic component from a supplier other than a supplier specified by the enterprise, an electronic component that does not conform to specifications of the enterprise, or an electronic component that does not perform the tasks of the target electronic component, but instead performs unauthorized activities such as sending data of the electronic device to a destination to allow a hacker to gain access of the data (such as to spy on network data or report information to a remote server) or to allow authorized remote control of the electronic device.

A customer or the enterprise upon receipt of an electronic device has no easy or quick way to verify whether electronic components are authorized electronic components (the target electronic components referred to above).

In accordance with some implementations of the present disclosure, a scanner can be used to verify an electronic component of an electronic device. The scanner can be a handheld scanner that a user can hold and attach to the electronic component for verifying the electronic component, without attaching the handheld scanner to another electronic component of the electronic device. To verify the electronic component, the scanner can send an input through an input/output (I/O) interface to the electronic component. The scanner can receive, at the I/O interface, an output responsive to the input from the device, where the output includes a cryptographic value based on a cryptographic operation applied on data of the input. The scanner can determine whether the device is an authorized device based on the received output.

Figure 1:
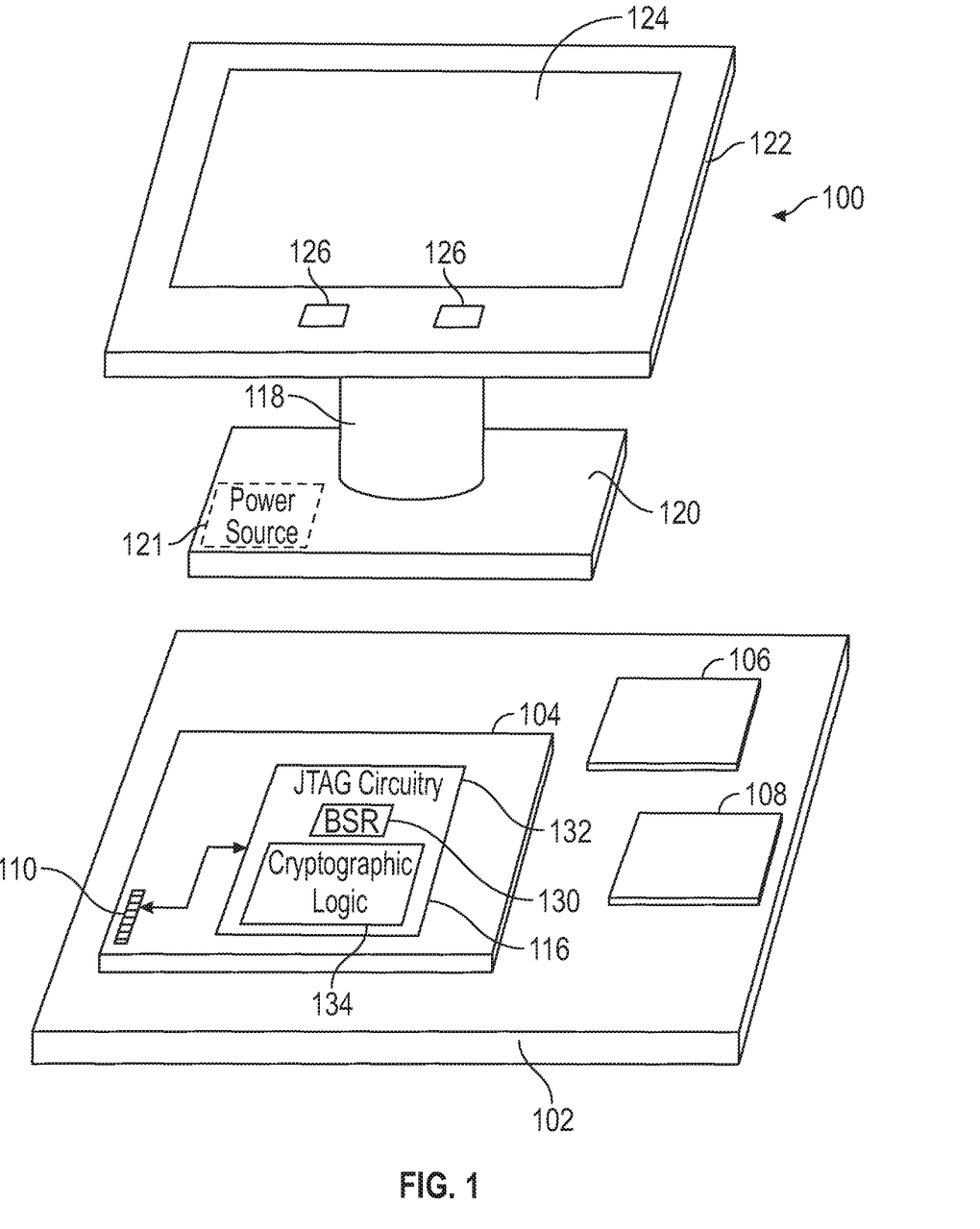
FIG. 1 is a top perspective view of a handheld scanner according to some examples for verifying an electronic component on a circuit board.

FIG. 1 is a perspective view of a handheld scanner 100 and a circuit board 102 on which are mounted various electronic components 104, 106, and 108. The handheld scanner 100 can be used to individually verify the electronic component 104. A "handheld scanner" refers to a scanner that can be held in a hand of a user during user of the handheld scanner to verify an electronic component.

"Verifying" an electronic component can refer to making an assessment of whether the electronic component is an authorized electronic component, such as an electronic component that is from a specific supplier, an electronic component that meets a target specification, or that has some other target characteristic. The ability to individually verify the electronic component 104 refers to the ability to individually interact with the electronic component 104 in a verification process, without having to attach or otherwise electrically connect the handheld scanner 100 to the other electronic components 106 and 108 on the circuit board 102.

In further examples, the handheld scanner 100 can be used to verify a subset of electronic components, where the subset can include on electronic component or multiple electronic components. Thus, in the present disclosure, reference to verification of an electronic component can refer to verifying a single electronic component or multiple electronic components. In further examples, the handheld scanner 100 can verify a circuit board to determine whether electronic components of the circuit board are connected in a target manner.

The circuit board 102 is part of an electronic device, such as a server, a storage device, a communication device, or any other type of electronic device. To perform the testing using the handheld scanner 100, the circuit board 102 may be removed from the electronic device, and the handheld scanner 100 can be used to test the electronic component 104 after the circuit board 102 is removed from the electronic device.

In other examples, the circuit board 102 can be left in the electronic device, and an outer housing of the electronic device can be removed. After removal of the outer housing, the electronic component 104 may be accessible using the handheld scanner 100 to verify the electronic component 104.

Figure 2:
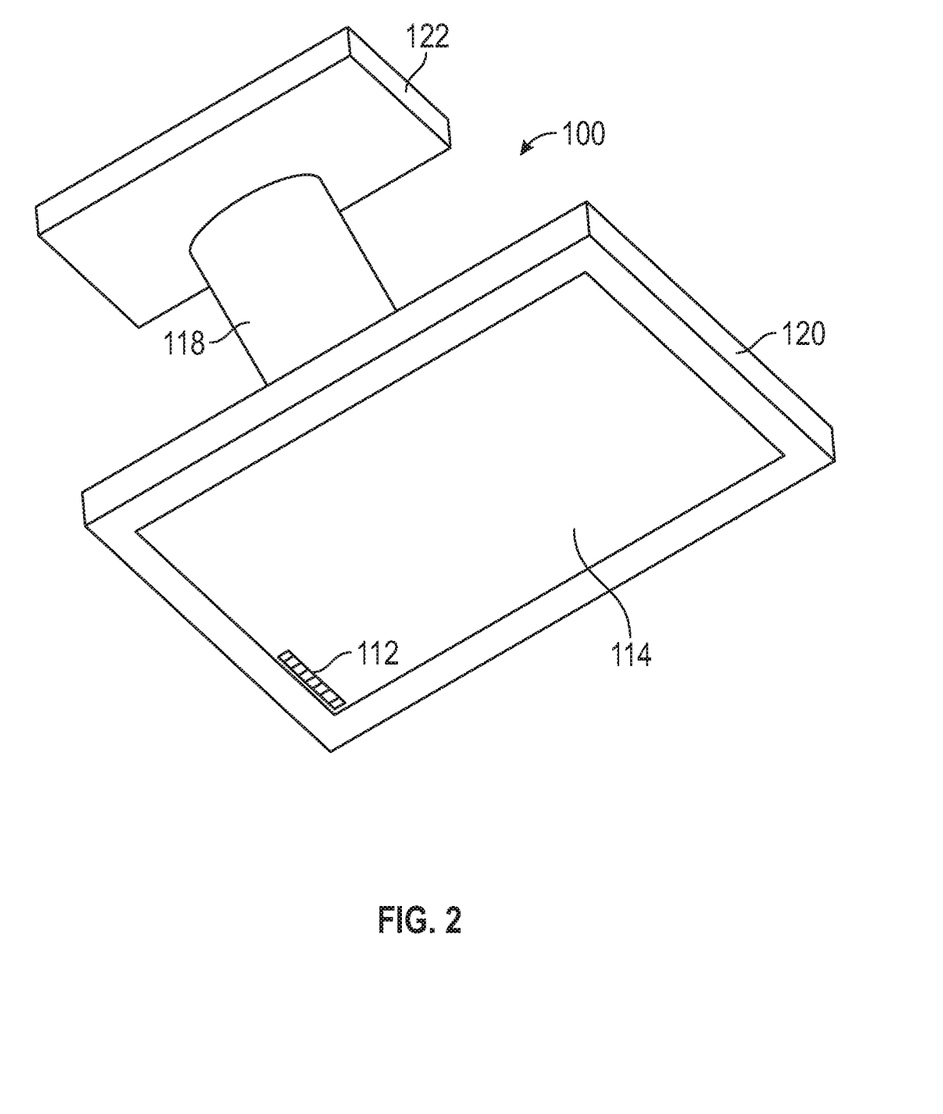
FIG. 2 is a bottom perspective view of a handheld scanner according to some examples.

The electronic component 104 includes a device input/output (I/O) interface 110, to allow for communicative connection with a corresponding scanner I/O interface 112 of the handheld scanner 100, as shown in FIG. 2.

The device I/O interface 110 includes I/O contacts, such as pins, contact pads, or any other electrically conductive structures that allows for electrical connection with the corresponding I/O contacts or other electrical structures of the scanner I/O interface 112.

The scanner I/O interface 112 can include a scanner power contact to electrically mate with a device power contact of the device I/O interface 110 to receive power from the electronic component 104, which can be powered by a power voltage of the circuit board 102 for example. The scanner power contact can receive power from the electronic component 104 instead of or in addition to the power provided by a power source 121 in the scanner 100.

In some examples, the scanner I/O interface 112 can be provided on a bottom surface of the handheld scanner 100. The device I/O interface 110 is provided on an upper surface 116 of the electronic component 104. This allows for ease of physical and electrical connection between the scanner I/O interface 108 and the device I/O interface 106 by simply mounting the bottom portion of the handheld scanner 100 over the electronic component 104.

As further shown in FIG. 2, the bottom portion of the handheld scanner 100 includes a cavity 114, which has an area that is slightly larger than the area of the upper surface 116 of the electronic component 104. This allows the cavity 114 to fit over the electronic component 104, to allow the scanner I/O interface 112 to make physical contact and establish an electrical connection with the device I/O interface 110.

In other examples, the scanner I/O interface 112 and the device I/O interface 110 can be provided on different parts of the handheld scanner 100 and the electronic component 104, respectively.

In some examples, the handheld scanner 100 can be used to test each of multiple different electronic components. In further examples, handheld scanners of different form factors can be used for testing respective electronic components of different sizes.

The scanner 100 further includes a column 118 that is attached to and extends above a base 120 of the scanner 100. The cavity 114 and the scanner I/O interface 112 are provided as part of the base 120 of the scanner 100. In some examples, the base 120 can include the power source 121 (e.g., a battery) to provide power to other components of the scanner 100. In different examples, the power source 121 can be located elsewhere in the scanner 100.

The column 118 has a profile that allows the user to grip the column 118, so that the user can manipulate the scanner 100 while gripping the column 118 to fit the bottom portion of the handheld scanner 100 over the electronic component 104 to perform verification of the electronic component 104. An upper part of the column 118 is attached to a display member 122. An upper surface of the display member 122 has a display device 124.

The display device 124 can be used to display various information associated with verification of the electronic component 104. For example, the display device 122 can display a first indicator to indicate that the electronic component 104 has been verified (i.e., the electronic component 104 is an authorized electronic component), or a second indicator to indicate that the electronic component 104 is not an authorized electronic component.

The display device 124 can further be used to display other information, such as to display further information associated with the verification process.

In further examples, instead of using the display device 122, other types of indicators, such as light emitting diodes (LEDs) can be used, to indicate different information.

User-actuatable buttons 126 can be used to scroll through information displayed by the display device 124. The buttons 126 can include scroll buttons to scroll displayed results up and down in the display device 122.

In other examples, the display device 124 can be omitted from the scanner 100. In such other examples, instead of or in addition to displaying results of a verification of an electronic component, the results of the verification can be communicated by the scanner 100 to another device. To enable communication of results of a verification of an electronic component, the scanner 100 can include a communication interface (e.g., a network interface controller) to communicate with the other device.

In further examples, instead of or in addition to the column 118, the scanner 100 can include a different type of member (e.g., a handle, a lever, etc.) that a user can grip or otherwise hold when using the scanner 100.

Figure 3:
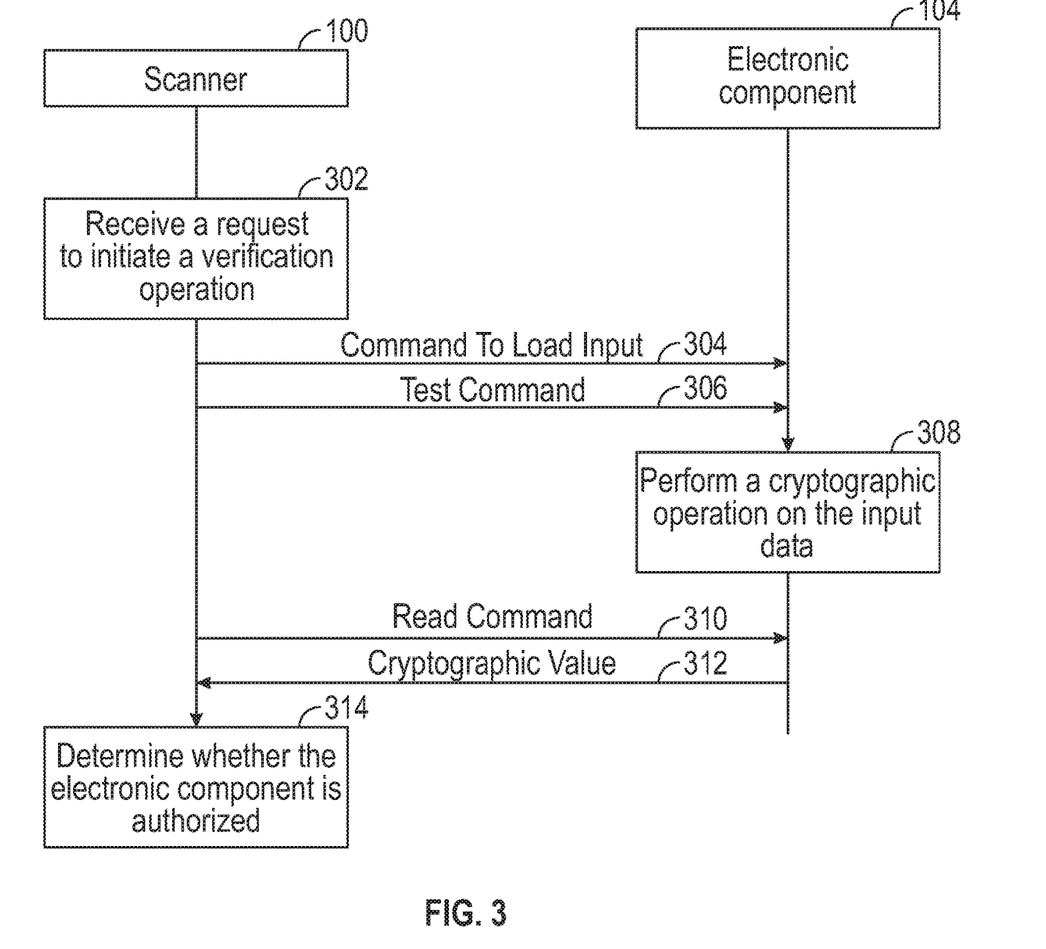
FIG. 3 is a message flow diagram of a process according to some examples.

FIG. 3 is a message flow diagram of a process performed between the scanner 100 and the electronic component 104, according to some examples.

The scanner 100 can receive (at 302) a request to initiate a verification operation to verify an electronic component, such as the electronic component 104. This request can be in response to user activation of a control element on the scanner 100, such as one of the buttons 126 shown in FIG. 1. Alternatively, the request can be generated in response to user activation of a control icon or other element in a user interface displayed by the display device 124 of the scanner 100.

As yet a further example, the request can be generated by the scanner 100 in response to physical engagement by the scanner I/O interface 112 with the device I/O interface 110. For example, engagement of the scanner I/O interface 112 with the device I/O interface 110 can cause an interrupt to generated in the scanner 100. The request can include the interrupt, or can be generated in the scanner 100 in response to the interrupt.

In response to the request, the scanner 100 sends (at 304) a command to load an input to the electronic component 104. In some examples, each of the scanner I/O interface 112 and the device I/O interface 110 includes I/O pins that are according to the Joint Test Action Group (JTAG) specification. JTAG is an industry standard for testing electronic components. In such examples, commands according to JTAG can be employed. JTAG is described in the Institute of Electrical and Electronics Engineers (IEEE) 1149.1 Specification.

Although reference is made to JTAG in some examples, it is noted that in other examples, different protocols (whether industry standard or proprietary) can be used to perform verification by the scanner 100 of an electronic component.

In examples where the scanner I/O interface 112 and the device I/O interface 110 include I/O pins, the I/O pins may be spring-loaded or biased by a biasing member to allow a more reliable electrical connection between the I/O pins of the scanner I/O interface 112 and the device I/O interface 110. In other examples, other types of attachment mechanisms can be used to engage the scanner I/O interface 112 with the device I/O interface 110.

The command to load the input that is sent by the scanner 100 can include a JTAG PRELOAD command. JTAG provides for Test Access Port (TAP) pins that include TCLK (a clock), TMS (a test mode select), TDI (an input), TDO (an output), and TRST (a reset). The PRELOAD command can be sent through the TDI pin of the scanner I/O interface 112 that is electrically contacted to the corresponding TDI pin of the device I/O interface 110. The scanner 100 sends, in conjunction with the PRELOAD command (at 304), input data to the electronic component 104, also using the TDI pin. In some examples, the input data can include a nonce, which is a random number generated by a pseudorandom number generator of the scanner 100. The PRELOAD command causes the input data (e.g., a nonce) to be placed into a boundary scan register (130 in FIG. 1) of the electronic component 104.

In some examples, the boundary scan register 130 can be part of JTAG circuitry 132 (e.g., boundary scan logic) of the electronic component 104. In other examples, the input data received by the electronic component 104 from the scanner 100 can be stored in another type of register, a memory, or any other storage medium.

Next, the scanner 100 sends (at 306) a test command to the electronic component 104. If JTAG is used, the test command includes an EXTEST command. The EXTEST command can also be sent to the electronic component 104 using the TDI pin. The EXTEST command is a command to perform external testing. In accordance with some implementations of the present disclosure, the electronic component 104 includes cryptographic logic 134 (e.g., part of the JTAG circuitry 132) that is responsive to the EXTEST command to perform (at 308) a cryptographic operation on the input data received from the scanner 100.

Although FIG. 1 shows the cryptographic logic 134 as being part of the JTAG circuitry 132, in other examples, the cryptographic logic 134 can be separate from but invocable by the JTAG circuitry 132. In further examples where the JTAG circuitry 132 is not used, the cryptographic logic 134 can be invoked by other logic of the electronic component 104 in response to the test command.

The cryptographic operation performed by the cryptographic logic 134 on the input data (e.g., a nonce) can include an encryption operation, a signing operation, or any other operation in which a cryptographic value is produced based on application of encryption. Performing signing of the input data can be performed by encrypting the input data using a private key of the electronic component 104. In some examples, the nonce can be encrypted. In other examples, a value (e.g., a hash value) based on the nonce can be encrypted.

An authorized electronic component includes the cryptographic logic 134 to perform a specific cryptographic operation (referred to as a "target cryptographic operation"). The target cryptographic operation can be defined by a manufacturer of the authorized electronic component, a customer of the authorized electronic component, or by another entity. An example of the target cryptographic operation is a signing operation that includes signing the input data using a private key known only to the authorized electronic component. The private key may be provided to the authorized electronic component by the manufacturer of the authorized electronic component, by a trusted third party, or by another entity, over a secure link. The private key may be stored in a storage of the authorized electronic component.

The corresponding public key to decrypt the cryptographic value produced by the signing can be provided to a receiver of the cryptographic value (where the receiver in some examples of the present disclosure is the scanner 100 as discussed further below).

An unauthorized electronic component would not be able to perform the target cryptographic operation, either because the unauthorized electronic component is without the cryptographic logic 134, or the unauthorized electronic component does not know or does not have access to the key or other secret used to perform the cryptographic operation.

Next, the scanner 100 sends (at 310) a read command to the electronic component 104. In examples where JTAG is used, the read command includes a SAMPLE command. The SAMPLE command can also be sent to the electronic component 104 using the TDI pin.

In response to the SAMPLE command, the electronic component 104 (e.g., the JTAG circuitry 132) sends a cryptographic value (at 312) produced based on applying the cryptographic operation on the input data to the scanner 100. The sending of the cryptographic value can use the TDO pin of each of the device I/O interface 106 and the scanner I/O interface 108.

In the foregoing examples where the JTAG PRELOAD, EXTEST, and SAMPLE commands are used, the verification of the electronic component 104 involves use of a modified form of a JTAG boundary scan operation, where the modified JTAG boundary scan operation differs from a normal JTAG boundary scan operation (as defined by current JTAG standards in that the modified JTAG boundary scan operation causes the performance of the cryptographic operation.

The scanner 100 determines (at 314) whether the electronic component 104 is an authorized electronic component based on the cryptographic value received from the electronic component 104. For example, if the cryptographic value is a signed value produced by encrypting the input data (e.g., a nonce) using the private key of the electronic component 104, the scanner 100 can attempt to decrypt the signed value using the public key of the electronic component 104. In some examples, the scanner 100 can retrieve or be provided with the public key by a manufacturer of the electronic component 104, by a customer, or by another entity. The public key can be communicated to the scanner 100 over a network, for example. If the decryption of the signed value produces the input data (e.g., the nonce) that was sent by the scanner 100 to the electronic component 104, then the scanner 100 has successfully determined that the electronic component 104 is authorized. In other words, the scanner 100 is able to confirm based on the decryption of the signed value producing a value that matches the input data that the electronic component 104 includes the cryptographic logic 134 that is able to perform the target cryptographic operation (such as by using a private key or other secret provisioned to the electronic component 104).

The determination that the electronic component 104 is authorized can mean that the electronic component 104 is an electronic component intended by a manufacturer, a customer, or other entity to be included in an electronic device in which the electronic component 104 is part of. For example, the determination that the electronic component 104 is authorized can mean that the electronic component 104 is not a counterfeit electronic component, is from a target supplier, conforms to specifications, and/or performs target tasks of the target electronic component.

The ability to verify the electronic component 104 provides some assurance to a customer or other entity that the will not perform unauthorized activities such as sending data to a destination to allow a hacker to gain access of the data (such as to spy on network data or report information to a remote server), or to allow authorized remote control of an electronic device, and so forth.

On the other hand, if the decryption of the input data produces a value that is different from the input data (e.g., the nonce), then the scanner 100 makes a determination that the electronic component 104 is not authorized (i.e., the electronic component 104 is without the cryptographic logic 134 or does not have access to the private key or other secret). In this latter case, the scanner 100 can output an indicator (such as in the display device 124 of FIG. 1) or in information sent to another device to indicate a failure in verifying the electronic component 104. A user can then take action, such as to remove the unauthorized electronic component 104, or to return the entire electronic device including the electronic component 104 to the manufacturer or assembler or other entity.

In other examples, if the cryptographic value is an encrypted value encrypted using the public key of the electronic component 104, the scanner 100 can determine whether the electronic component 104 is authorized by attempting to decrypt the encrypted value with a private key of the scanner 100.

Figure 4:
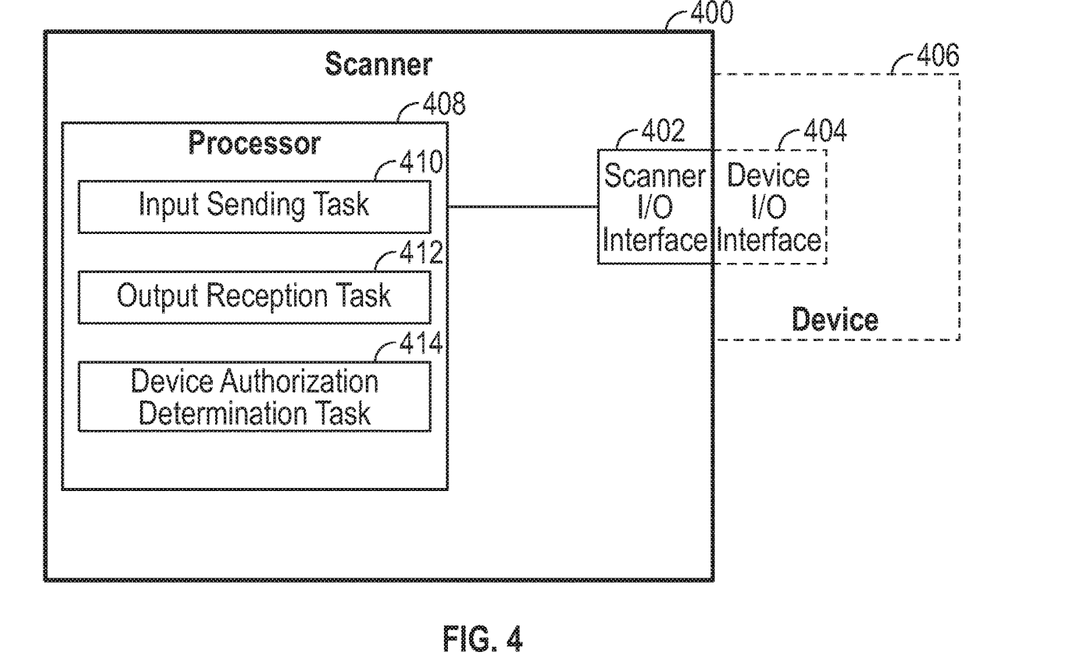
FIG. 4 is a block diagram of a scanner according to some examples.

FIG. 4 is a block diagram of a scanner 400 according to some examples. The scanner 400 can be an example of the scanner 100 of FIG. 1.

The scanner 400 includes a scanner I/O interface 402 to physically and communicatively connect to a device I/O interface 404 of a device 406 to be verified by the scanner 400.

The scanner 400 includes a hardware processor 408 to perform various tasks. A hardware processor can include a microprocessor, a core of a multi-core microprocessor, a microcontroller, a programmable integrated circuit, a programmable gate array, a digital signal processor, or another hardware processing circuit.

The hardware processor 408 is to perform various tasks. The tasks include an input sending task 410 to send an input through the scanner I/O interface 402 to the device 406.

The tasks further include an output reception task 412 to receive, at the scanner I/O interface 402, an output responsive to the input from the device 406. The output includes a cryptographic value based on a cryptographic operation applied on data of the input.

The tasks additionally include a device authorization determination task 414 to determine whether the device is an authorized device based on the received output.

In some examples, the scanner 400 is a handheld scanner to individually attach to the device 406 that is mounted on a platform (e.g., a circuit board or other structure), without the handheld scanner attaching to another device mounted on the platform.

In further examples, the scanner 400 includes a power source. The scanner 400 can perform the input sending task 410, the output reception task 412, and the device authorization determination task 414 while powered using the power source.

Figure 5:
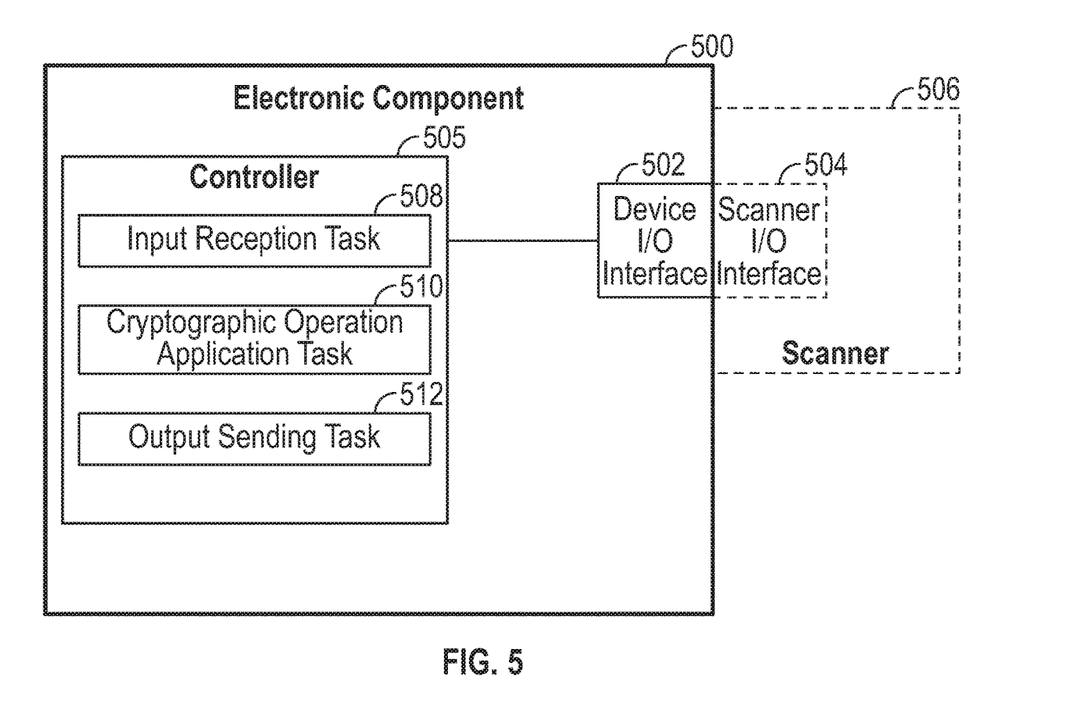
FIG. 5 is a block diagram of an electronic component according to some examples.

FIG. 5 is a block diagram of an electronic component 500 that includes a device I/O interface 502 to physically and communicatively connect to a scanner I/O interface 504 of a scanner 506 useable to verify the electronic component 500.

The electronic component 500 includes a controller 505 to perform various tasks. For example, the controller 505 can include JTAG circuitry configured according to some implementations of the present disclosure (i.e., with the ability to perform a cryptographic operation as discussed).

The controller 505 can perform various tasks. The tasks include an input reception task 508 to receive an input through the device I/O interface 502 from the scanner 506.

The tasks further include a cryptographic operation application task 510 to apply a cryptographic operation on data of the input to produce a cryptographic value.

The tasks further include an output sending task 512 to send, to the device I/O interface 502, an output comprising the cryptographic value for use by the scanner 506 in a determination of whether the electronic component 500 is an authorized electronic component.

In some examples, the controller 505 is to perform the input reception task 508, the cryptographic operation application task 510, and the output sending task 512 while a platform (e.g., a circuit board, an electronic device, etc.) that the electronic component is part of remains inactive. The electronic component 500 being "inactive" can refer to the electronic component 500 being in a pre-boot state (i.e., the electronic component 500 has not yet been initialized to perform normal operations, or the electronic component 500 otherwise being idle).

Figure 6:
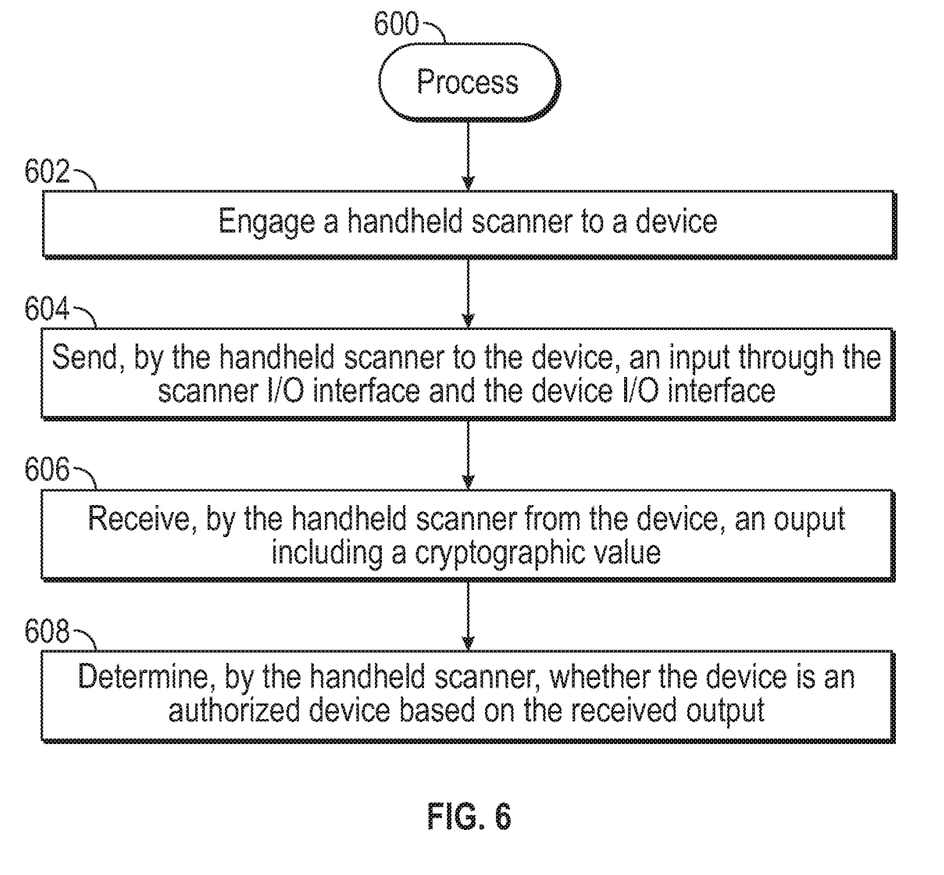
FIG. 6 is a flow diagram of a process according to some examples.

FIG. 6 is a flow diagram of a process 600 according to some examples. The process 600 includes engaging (at 602) a handheld scanner to a device on a platform, the engaging comprising establishing a physical and communicative connection between a scanner I/O interface of the handheld scanner and a device I/O interface of the device.

The process 600 includes sending (at 604), by the handheld scanner to the device, an input through the scanner I/O interface and the device I/O interface.

The process 600 includes receiving (at 606), by the handheld scanner from the device, an output responsive to the input, the output comprising a cryptographic value based on a cryptographic operation applied on data of the input.

The process 600 includes determining (at 608), by the handheld scanner, whether the device is an authorized device based on the received output.

Tasks discussed herein may be performed by machine-readable instructions that are stored in a storage medium, which can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A scanner to verify a device on a circuit board, comprising:
    a scanner input/output (I/O) interface to physically and communicatively connect to a device I/O interface of the device on the circuit board without electrically connecting the scanner to another device on the circuit board, wherein the scanner I/O interface is to make physical contact with the device I/O interface on a surface of the device to perform a verification of the device; and
    a processor to:
        as part of the verification, send an input through the scanner I/O interface to the device while the scanner I/O interface is in physical contact with the device I/O interface,
        receive, at the scanner I/O interface from the device, an output responsive to the input, the output comprising a cryptographic value based on a cryptographic operation applied on data of the input, and
        determine whether the device is an authorized device based on the received output.

2. The scanner of claim 1, wherein the scanner is a handheld scanner to individually attach to the device mounted on the circuit board, without the handheld scanner attaching to another device mounted on the circuit board.

3. The scanner of claim 1, wherein the scanner comprises a power source, and is to perform the sending, the receiving, and the determining while powered using the power source.

4. The scanner of claim 1, further comprising a scanner power contact to electrically mate with a device power contact of the device to receive power from the device, the scanner to perform the sending, the receiving, and the determining while powered using the power received through the scanner power contact.

5. The scanner of claim 1, comprising:
    a base having a bottom portion on which the scanner I/O interface is provided, wherein the scanner I/O interface on the bottom portion of the base is to physically contact the device I/O interface provided on an upper surface of the device.

6. The scanner of claim 5, wherein the scanner I/O interface comprises spring-loaded contacts to make physical and electrical contact with corresponding I/O contacts that are part of the device I/O interface.

7. The scanner of claim 1, further comprising a display device to display a result of the determining.

8. The scanner of claim 1, wherein the processor is to:
    send a first command through the scanner I/O interface to the device, the first command to cause the device to apply the cryptographic operation on the data of the input.

9. The scanner of claim 8, wherein the processor is to:
    send a second command through the scanner I/O interface to read the cryptographic value from the device.

10. The scanner of claim 1, wherein the sending and the receiving are part of a Joint Test Action Group (JTAG) boundary scan of the device by the scanner.

11. The scanner of claim 6, wherein the base comprises a cavity and the bottom portion is in the cavity, and wherein the cavity is to fit over the device on the circuit board, and the spring-loaded contacts of the scanner I/O interface are to physically contact the I/O contacts of the device I/O interface when the device is received in the cavity of the base.

12. An electronic component comprising:
    a surface;
    a device input/output (I/O) interface on the surface to physically and communicatively connect to a scanner I/O interface of a scanner useable to perform a verification of the electronic component, wherein the device I/O interface on the surface is to make physical contact with the scanner I/O interface while the electronic component is on a circuit board such that the electronic component is to interact with the scanner in performing the verification without the scanner electrically connecting to another electronic component on the circuit board;
    a controller to:
        as part of the verification, receive an input through the device I/O interface from the scanner while the device I/O interface is in physical contact with the scanner I/O interface,
        apply a cryptographic operation on data of the input to produce a cryptographic value, and
        send, to the device I/O interface, an output comprising the cryptographic value for use by the scanner in a determination of whether the electronic component is an authorized electronic component.

13. The electronic component of claim 12, wherein the controller is to perform the receiving, the applying, and the sending while the circuit board that the electronic component is mounted on remains inactive.

14. The electronic component of claim 12, wherein the controller comprises Joint Test Action Group (JTAG) boundary scan logic to perform the receiving, the applying, and the sending.

15. The electronic component of claim 12, wherein the cryptographic operation comprises an encryption of the data of the input using a private key.

16. The electronic component of claim 12, wherein the device I/O interface is to make physical contact with the scanner I/O interface on a bottom surface of the scanner when the electronic component is received in a cavity of the scanner.

17. The electronic component of claim 16, wherein the controller is to:
    receive a first command through the device I/O interface from the scanner,
    apply the cryptographic operation in response to the first command,
    receive a second command through the device I/O interface from the scanner, and send the output to the device I/O interface in response to the second command.

18. A method comprising:
- engaging a handheld scanner to a device on a circuit board, the engaging comprising establishing a physical and communicative connection between a scanner input/output (I/O) interface of the handheld scanner and a device I/O interface of the device, wherein the scanner I/O interface makes physical contact with the device I/O interface on a surface of the device to perform a verification of the device on the circuit board and without the handheld scanner electrically connecting to another device on the circuit board;
- as part of the verification, sending, by the handheld scanner to the device, an input through the scanner I/O interface and the device I/O interface while the device is on the circuit board;
- receiving, by the handheld scanner from the device, an output responsive to the input, the output comprising a cryptographic value based on a cryptographic operation applied on data of the input; and
- determining, by the handheld scanner, whether the device is an authorized device based on the received output.

19. The method of claim 18, wherein the handheld scanner is engaged individually to the device on the circuit board without engaging another device on the circuit board.

20. The method of claim 18, wherein the scanner I/O interface makes physical contact with the device I/O interface on a bottom surface of the handheld scanner when the device on the circuit board is received in a cavity of the handheld scanner.

\* \* \* \* \*